United States Patent
Fliam et al.

(10) Patent No.: US 12,056,252 B2
(45) Date of Patent: *Aug. 6, 2024

(54) DOMAIN NAME OBFUSCATION AND METADATA STORAGE VIA ENCRYPTION

(71) Applicant: Comcast Cable Communications, LLC, Philadelphia, PA (US)

(72) Inventors: Richard Fliam, Greenwood Village, CO (US); David Arbuckle, Denver, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/327,720

(22) Filed: Jun. 1, 2023

(65) Prior Publication Data

US 2023/0385434 A1 Nov. 30, 2023

Related U.S. Application Data (63) Continuation of application No. 17/446,045, filed on Aug. 26, 2021, now Pat. No. 11,704,421, which is a
(Continued)

(51) Int. Cl.
*G06F 21/62* (2013.01)
*G06F 16/907* (2019.01)
*G06F 21/10* (2013.01)
*H04L 9/40* (2022.01)
*H04L 61/4511* (2022.01)

(52) U.S. Cl.
CPC ........ *G06F 21/6209* (2013.01); *G06F 16/907* (2019.01); *G06F 21/10* (2013.01); *H04L 61/4511* (2022.05); *H04L 63/0281* (2013.01)

(58) Field of Classification Search
CPC .... G06F 21/6209; G06F 16/907; G06F 21/10; H04L 61/4511; H04L 63/0281; H04L 2101/30; H04L 61/301; H04L 63/0245; H04L 63/029; H04L 63/0428; H04L 67/02; H04L 67/53; H04L 67/56; H04L 67/565; G06Q 30/0277
See application file for complete search history.

(56) References Cited

U.S. PATENT DOCUMENTS 6,728,767 B1  4/2004  Day et al.
6,799,214 B1  9/2004  Li
(Continued)

FOREIGN PATENT DOCUMENTS

CN   104967613 A  * 10/2015  ............. H04L 29/06
CN   109040134 A     12/2018
(Continued)

OTHER PUBLICATIONS

He et al., translated portion of CN 113364781 A, Sep. 7, 2021, 1 pg.
(Continued)

*Primary Examiner* — Christopher A Revak
(74) *Attorney, Agent, or Firm* — BakerHostetler (57) ABSTRACT

Systems and methods are described for the generation of domain names that may be associated with a particular user device and may be encrypted to obfuscate the domain names of content requested by the user device.

48 Claims, 6 Drawing Sheets

Related U.S. Application Data continuation of application No. 16/122,565, filed on Sep. 5, 2018, now Pat. No. 11,106,807.

(56) References Cited

U.S. PATENT DOCUMENTS

| | | |
|---|---|---|
| 6,954,456 B2 | 10/2005 | Cranor et al. |
| 7,693,959 B2 | 4/2010 | Leighton et al. |
| 8,224,986 B1 | 7/2012 | Liskov et al. |
| 9,177,335 B1 | 11/2015 | Carasso |
| 9,565,558 B2 | 2/2017 | Radpour |
| 9,949,301 B2 | 4/2018 | Freudiger et al. |
| 11,106,807 B2 | 8/2021 | Fliam et al. |
| 11,552,925 B1 * | 1/2023 | Craciun ............... H04L 61/4511 |
| 11,704,421 B2 * | 7/2023 | Fliam ..................... G06F 21/10 |
| | | 726/1 |
| 2006/0020684 A1 | 1/2006 | Mukherjee et al. |
| 2006/0059337 A1 | 3/2006 | Poyhonen et al. |
| 2015/0082027 A1 | 3/2015 | Ma et al. |
| 2015/0181283 A1 | 6/2015 | Maciej |
| 2017/0093802 A1 | 3/2017 | Norum et al. |
| 2017/0109797 A1 | 4/2017 | Boffa et al. |
| 2017/0169123 A1 | 6/2017 | Reshadi et al. |
| 2018/0137546 A1 | 5/2018 | Kang |
| 2018/0357093 A1 * | 12/2018 | Cong ..................... G06F 12/109 |
| 2019/0190894 A1 | 6/2019 | Kapoor et al. |
| 2020/0137021 A1 | 4/2020 | Janakiraman |
| 2021/0029074 A1 * | 1/2021 | Buck .................. H04L 63/0236 |
| 2021/0034719 A1 | 2/2021 | Brown |
| 2022/0191164 A1 | 6/2022 | Stolbikov et al. |

FOREIGN PATENT DOCUMENTS

| | | | |
|---|---|---|---|
| CN | 112887451 A * | 6/2021 | ............. H04L 29/12 |
| CN | 113364781 A | 9/2021 | |

OTHER PUBLICATIONS

US Patent Application filed on Aug. 26, 2021, entitled "Domain Name Obfuscation and Metadata Storage Via Encryption", U.S. Appl. No. 17/446,045.

Zhou, translated portion of CN 109040134 A, Dec. 18, 2018, 1 pg.

\* cited by examiner

DOMAIN NAME OBFUSCATION AND METADATA STORAGE VIA ENCRYPTION

CROSS REFERENCE TO RELATED APPLICATIONS

This application is a continuation of U.S. patent application Ser. No. 17/446,045, filed Aug. 26, 2021, which is a continuation of U.S. patent application Ser. No. 16/122,565, filed Sep. 5, 2018, each of which are hereby incorporated by reference in their entirety.

BACKGROUND

Address names may be used to allow users and user devices to find and obtain content. An address name may take the form of a uniform resource locator (URL). A URL may comprise a network protocol, domain name, and file name. The network protocol may be used by the software program to access content identified by the URL. The domain name may indicate the network location, such as a server, where the content may be stored and may be denoted as a human-readable address, e.g., "mysite.com". The filename may indicate an identifier associated with the content itself. Retrieved content, such as a webpage, may comprise any number of URLs or links to other content, which the software program may retrieve to piece together the content. However, certain address names or domain names may be subject to block lists or other processing lists that may affect access and/or redirection of a user device to certain content. These and other shortcomings of the art may be addressed by the present disclosure.

SUMMARY

Systems and methods are described for the generation of unique domain names. The unique domain names may be associated with a particular user device and may be encrypted to prevent access to the original domain names of content requested by the user device. Such systems and methods may limit user devices from blocking domain names. One or more user devices authorized to access a content item may be assigned an encryption key unique to that user device in lieu of a single key shared to all authorized user devices. A user device may request content from a content provider, and a content gateway associated with the content provider may receive the request. The content gateway may retrieve the requested content and generate a unique domain name, which may be associated with the user device. The content gateway may encrypt the unique domain name and send the encrypted domain name to the user device. The user device may send one or more encrypted domain names to a proxy DNS to perform DNS resolution. For the received encrypted domain names, the proxy DNS may decrypt the encrypted domain name and resolve the domain name to an address. The proxy DNS may send the address to the user device, which may request the content from the content host. The user device may receive the requested content, but may not able to block any domain names in that content because the user device did not receive plaintext domain names or the encryption key.

BRIEF DESCRIPTION OF THE DRAWINGS

The following drawings show generally, by way of example, but not by way of limitation, various examples discussed in the present disclosure. In the drawings.

DETAILED DESCRIPTION

Electronic content is consumed on a daily basis. Much of user-consumed content is consumed via smartphones, laptops, desktops, tablets, game consoles, and other computer systems, typically involving use of the Internet or other computer network.

A user or a user device associated with the user may request content from a known content source, (e.g., a content host or content provider) to be able to retrieve the content. A content source may be a software program or service, a computer server, a computer storage device, or any other accessible host of content. Once the content source is known, the user or user device may attempt to retrieve content from that source using any available method of computer data transfer. For example, a user may use a browser program to request content using a uniform resource locator (URL). A URL may specify a network location, and by submitting the URL to the browser program, the user directs the browser program to request content from the network location specified by the URL. A set top box may be configured to automatically connect to one or more network locations to access content.

Domain names may be human-readable for user convenience, but do not directly address network locations. Network locations may be numerical addresses that a device may connect to in order to access data, such as an Internet Protocol (IP) address to access a webpage. Because of this difference, domain names may need to be translated so that a user device may find the network location and access the requested content. The user device may send a content request using a domain name to a Domain Name System (DNS) server. A DNS server may comprise a mapping of domain names to their address counterparts. The DNS server may resolve the address of a domain name using the mapping, and may send this address to the user device. The user device may use the address to send the content request directly to the network location of a content host at that address. For example, if a user device is attempting to access the network location "http://www.mysite.com/index.html", the request may be sent to a DNS server to resolve "www.mysite.com" to its IP address of "1.1.1.1", and the IP address "1.1.1.1" may be sent back to the user device. Then the user device may request the content directly from its address of "1.1.1.1", using any feasible method, such as an HTTP request. Note that content, such as "index.html", may itself comprise a plurality of domain names, one or more of which may need to be resolved by a DNS server to properly consume the content.

A user device may be configured to selectively obtain content based on block lists or other processing lists. A user may create a block list containing known undesirable domain names or domain names containing undesirable keywords, such as those domain names associated with advertisements or those domain names containing the keyword "ad." With such a scheme, a user device may ignore and/or not retrieve content associated with those blocked domain names. Configuring a user device to ignore certain domain names may allow the user device to remove sections of content that is meant to be included, such as advertisements used to financially sustain the content. Removal of such content negatively affects content hosts and their financial partners.

A user device may be blocked from retrieving certain content unless the user device is given a key to access that content. A content provider may host an encrypted content item that is accessible only by user devices having the encryption key to the content item. A single encryption key may be shared to all user devices eligible to access the content item. However, use of a single encryption key for a plurality of users may simplify the processes by which an unauthorized user device may gain access to the encryption key and access the encrypted content item. Thus, the use of a single encryption key shared among a user base may allow certain user devices to avoid paying subscription fees or other fees associated with access to the content item, which also negatively affects content hosts and their financial partners.

Systems and methods are described for the generation of unique domain names that may be associated with a particular user device. A generated unique domain name may comprise metadata associating the generated unique domain name to a specific user device. Such metadata may allow a content provider, or components of a content provider, to gather analytics about the requesting user device and/or determine service-level agreement (SLA) information from the metadata and/or from a license server associated with the content provider. Generated unique domain names may be encrypted to prevent access to the original domain names of content requested from the user device.

Described systems and methods may limit user devices from blocking domain names. A user device authorized to access a content item may be assigned an encryption key unique to that user device in lieu of a single key shared to all authorized user devices. A user device may request content from a content provider, and a content gateway associated with the content provider may capture the request. The content gateway may retrieve the requested content. The content gateway may generate a unique domain name, which may be associated with the user device. The content gateway may encrypt the unique domain name and send the encrypted domain name to the user device. The content gateway may also identify and encrypt one or more domain names of the requested content and send the encrypted domain names to the user device without generating a unique domain name.

DNS records associated with encrypted domain names may be configured to direct a DNS resolution request to a proxy DNS server ("proxy DNS") associated with the content provider that has access to the encryption key. A user device may send one or more of the encrypted domain names to the proxy DNS to resolve the encrypted domain name. For a received encrypted domain name, the proxy DNS may decrypt the encrypted domain name and resolve the domain name to an address. The address may be sent to the user device. The user device may request the content from the content host by using the address. The user device may receive the requested content, but may not able to block any domain names in that content because the user device did not receive plaintext domain names or the encryption key.

Figure 1:
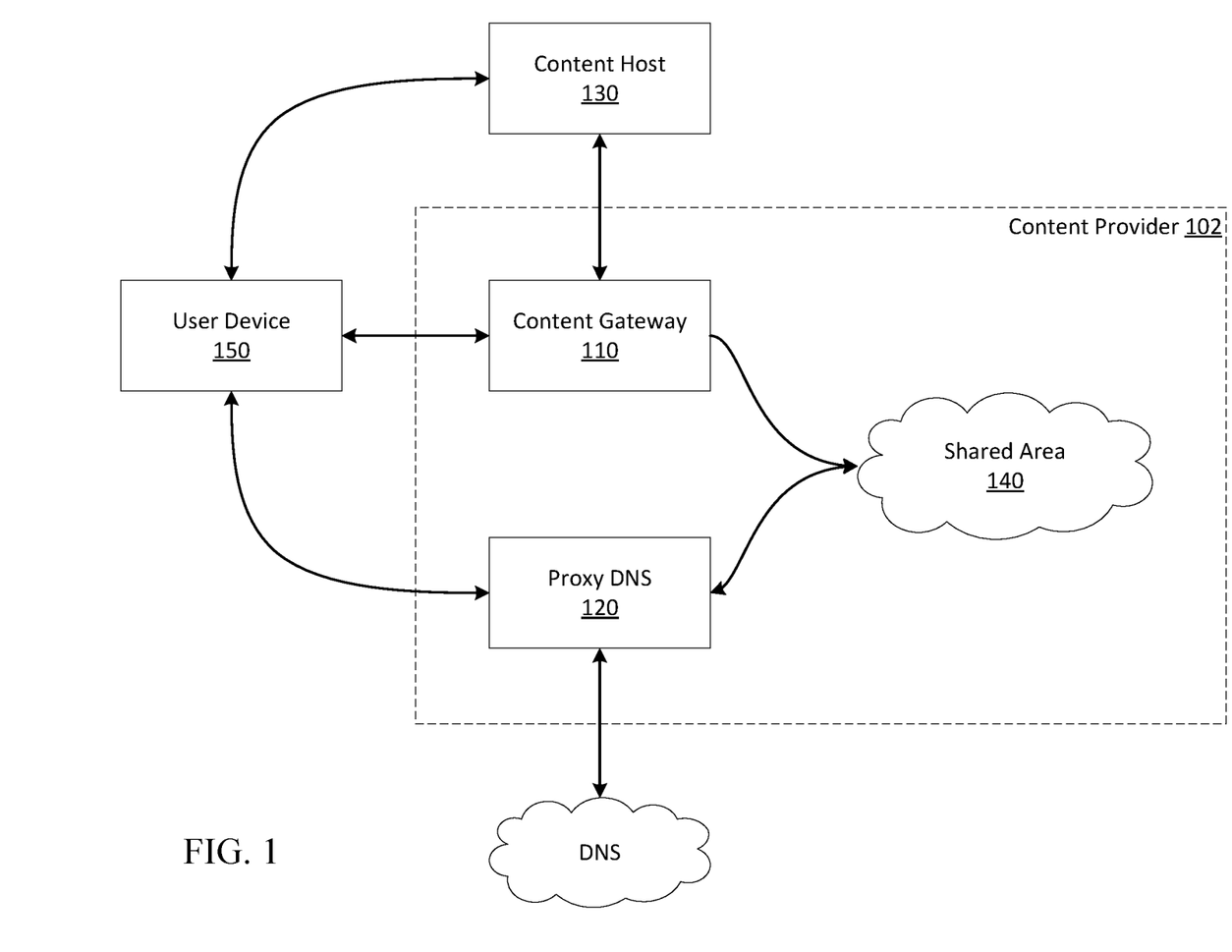
FIG. 1 shows an example network.

FIG. 1 shows an example of a system using embodiments described herein. Such a system may comprise a content provider 102, a user device 150, and a content host 130. The example entities of FIG. 1 may be part of or use a computer network, which may be a small, home network or part of a large network such as the Internet, or a combination of both. The entities of FIG. 1 may also be part of a single computer system.

The content provider 102 may serve any number of user devices, such as a user device 150, and may comprise a plurality of components. Two such components may be a content gateway 110 and a proxy DNS 120. The content gateway 110 may be an entry point to the content provider 102 for a user device 150 and may be communicatively connected to the proxy DNS 120. The proxy DNS 120 may also be communicatively connected to the user device 150 that may access the content gateway 110 and may receive a request from such a user device to perform a DNS lookup. The proxy DNS 120 may be communicatively connected to one or more DNS servers. An additional component of the content provider 102 may be a shared area 140, which may store information private to the content provider 102. The content gateway 110 and the proxy DNS 120 may be communicatively connected to the shared area 140. The content gateway 110 and the proxy DNS 120 may not be directly connected, as shown in the example system shown in FIG. 1.

The user device 150 may be communicatively connected to other components of the system. As described above, the user device 150 may be communicatively connected to components of the content provider 102, such as the content gateway 110 and the proxy DNS 120. However, the user device 150 may not be communicatively connected with the shared area 140 because the user device 150 may not be a component of the content provider 102. The user device 150 may also be communicatively connected to one or more content hosts, such as the content host 130.

The content host 130 may be communicatively connected to any number of devices or servers, such as the user device 150. In operation, the content host 130 may wait for a request from such a device and may then respond accordingly.

The components of the system portrayed in FIG. 1 may operate in concert to obfuscate domain names from the user device 150.

The user device 150 may be a device requesting to access content from a network the user device is connected to. The content may be hosted on a server, such as the content host 130. Access to the content host 130 may be provided by a content provider, such as the content provider 102, which may be an internet service provider (ISP), media company, content delivery network (CDN), or other provider of content. A request for content from the user device 150 may include a domain name of the content host 130 and may be any type of request recognized by the content provider 102, such as a URL or a request for media content from a set top box. For example, a user may request content from a CDN via a laptop, a television, a set top box, a smartphone, a tablet, a desktop, a virtual reality headset, or any other device capable of requesting and presenting content to a user. A user may submit a URL to a web browser on the user device 150. The web browser may initiate a request to a DNS server to resolve the URL into an IP address. The web browser may receive the IP address and request the content using the IP address, which may correspond to the IP address of a content gateway 110 of the content provider 102, as shown in FIG. 1.

The content gateway 110 may be a device or software program associated with the content provider 102 that may act as a gatekeeper for user requests, such as those from the user device 150. The content gateway 110 may be configured such that a request made to a content host, such as the content host 130, may resolve directly to an address of the content gateway 110. The content gateway 110 may receive a user request from the user device 150 and process the user request in accordance with any programming logic associated with the content gateway 110. The content gateway 110 may host content the user is requesting and be able to immediately deliver that content or may retrieve the content the user is requesting from the content host 130. The content gateway 110 may generate a unique domain name for the user device 150 to use to access content the user device 150 is requesting. A new unique domain name may be generated for each request from the user device 150 and/or one or more domain names comprising one or more parts of the content the user is requesting. The unique domain name may comprise some or all of the content the user device 150 is requesting, such as a domain name of the content or the contents of a requested webpage. The unique domain name may be encrypted with an encryption key. The content gateway 110 may also encrypt a requested domain name without generating a unique domain name. DNS records associated with encrypted domain names may be configured to direct a DNS resolution request to the proxy DNS 120, which may also be associated with the content provider 102. If the content gateway 110 hosts the content or retrieves the content, such as an initial webpage the user device 150 is attempting to access, the content gateway 110 may identify and replace links and/or domain names in the content with one or more encrypted unique domain names to obfuscate the links and/or domain names to the user device 150.

The encryption key may not be shared with the user device 150, but may be sent to a shared area 140 for use by the proxy DNS 120 to decrypt the encrypted domain name (s) at a later time. The shared area 140 may be a server, cloud, or other storage area controlled by the content provider 102. The shared area 140 may also be unused or nonexistent, and the content gateway 110 may directly share the encryption key with the proxy DNS 120. The content gateway 110 may send the encrypted domain names to the user device 150. Because the encryption key may not be shared with the user device 150, the user device 150 may not be able to decrypt the domain names, and the plaintext domain names may remain inaccessible from the user device 150.

The user device 150 may treat an encrypted domain name like any other domain name. Thus, the user device 150 may send a request to a DNS server to resolve the encrypted domain name into its address. Because DNS records associated with the encrypted domain name may be configured to direct requests to the proxy DNS 120, the request may be captured by the proxy DNS 120. The proxy DNS 120 may have access to the encryption key, e.g., from the content gateway 110 or from access to the shared area 140, that may be used to decrypt the encrypted domain name. The proxy DNS 120 may use the encryption key to decrypt the domain name. As described above, the decrypted domain name may comprise contents of the request from the user device 150. The proxy DNS 120 may perform a DNS lookup on the decrypted domain name to resolve its contents into an address and may send this address back to the user device 150.

The user device 150 may receive the address, which may identify the network location of the device hosting the content the user device 150 initially requested, such as the content host 130. The user device 150 may use the address to request the desired content directly from the content host 130. In turn, the content host 130 may receive and fulfill the request and send the requested content to the user device 150.

Throughout the above process, the user device 150 was not able to view or determine the domain name of the content host 130 because the user device was only given the address of the content host 130. Thus, the user device 150 was not able to block or ignore any domain names, including those associated with advertisements.

The content gateway 110, the proxy DNS 120, the content host 130, the shared area 140, and the user device 150 may be physical or digital and take any suitable form for their described purposes. For example, they may take the form of software components on one or more computers or one or more modules within a single software suite. Communicative connections between these components may be physical connections, such as those via hardware circuits or LAN cables, wireless connections, such as those via WiFi or cellular, or any other suitable communicative connection.

Figure 2:
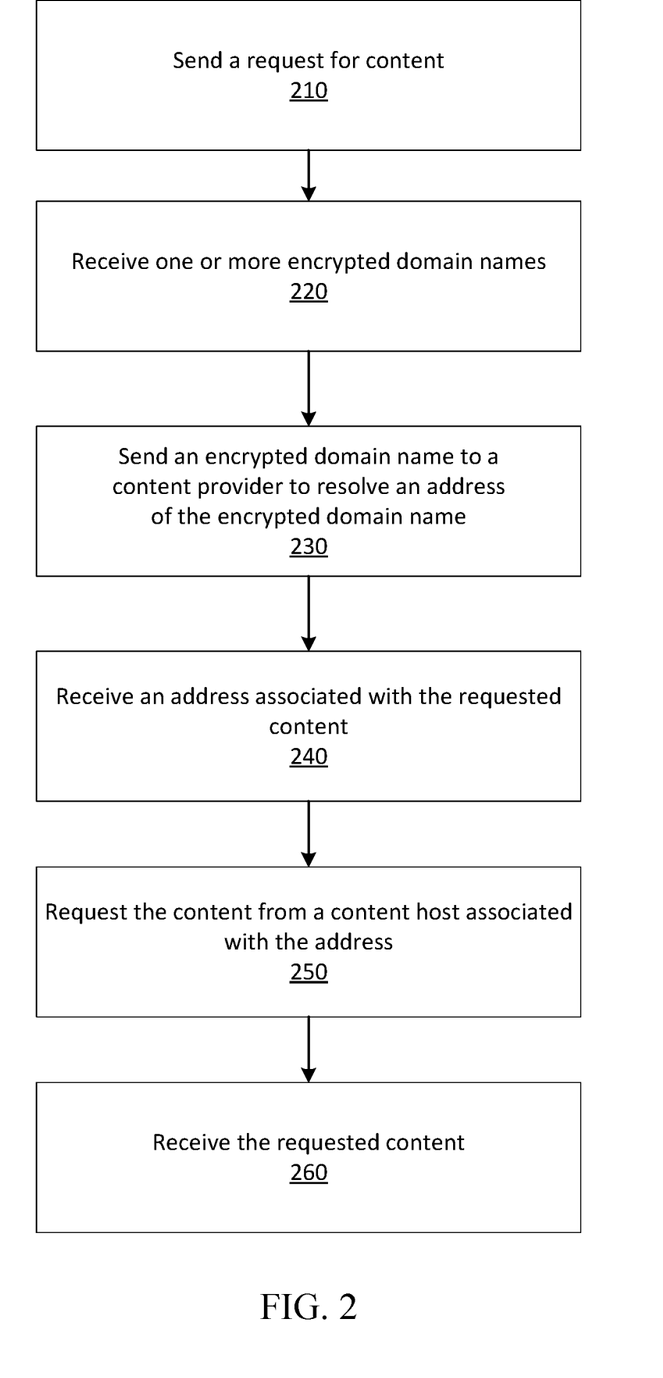
FIG. 2 is a flow diagram of an example method.
Figure 3:
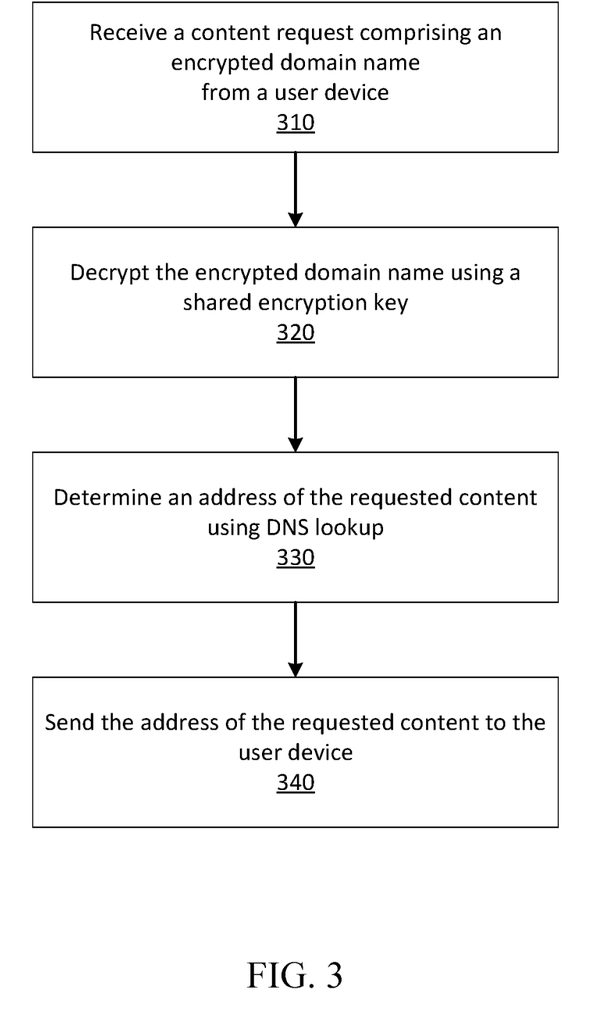
FIG. 3 is a flow diagram of an example method.
Figure 4:
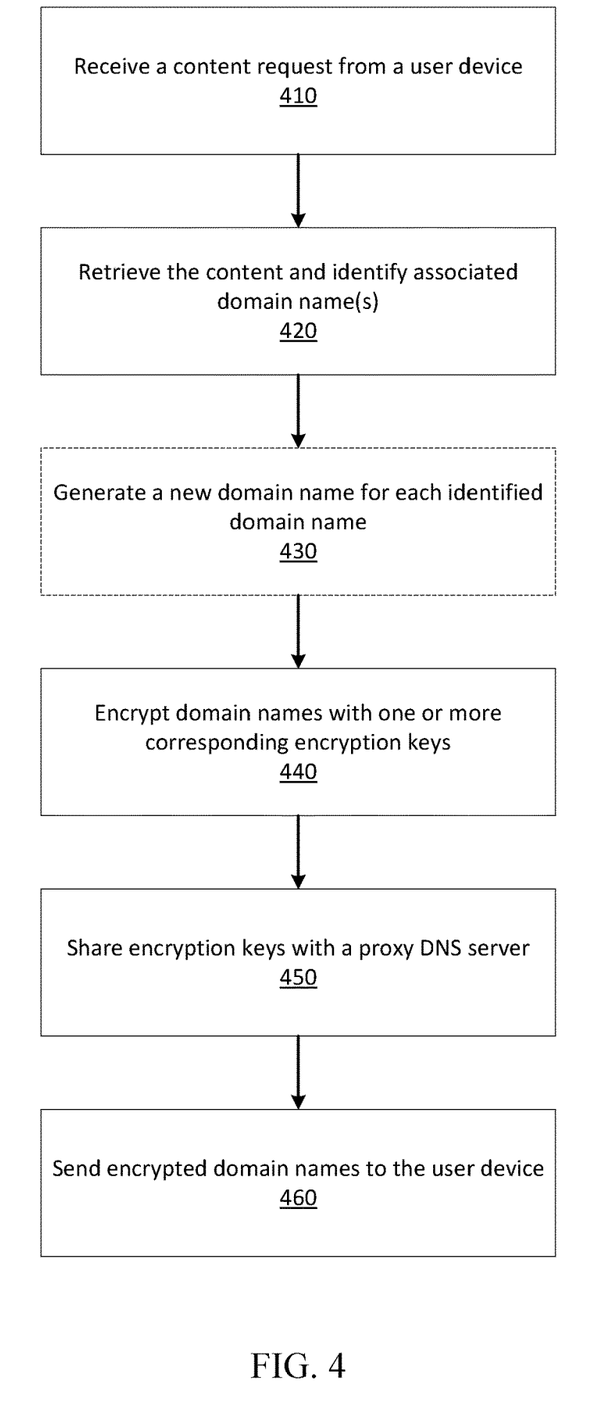
FIG. 4 is a flow diagram of an example method.

FIGS. 2-4 are flow diagrams showing an example process for a user device, such as the user device 150, to request and access content using the obfuscation processes described above. Although FIGS. 2-4 are shown as a sequence of blocks, the shown sequences should not be construed as limiting the scope of the present disclosure. In various cases, aspects, and embodiments, the blocks and described operations may be altered, omitted, reordered, or performed in parallel. For purposes of illustration, reference is made to the network described in connection with FIG. 1, although any suitable network and systems may be used to implement the described processing.

FIG. 2 shows an example of a domain name obfuscation process from the perspective of a user device, such as the user device 150 (FIG. 1).

At block 210, a user device, such as the user device 150, may send a request for content. The content may be stored on a content host, such as the content host 130. The request may be serviced by a content provider that the user device has access to, such as the content provider 102. A content gateway associated with the content provider, such as the content gateway 110, may be an entry point to the content host. Such a content gateway may be visible to the user device or may be opaque, meaning the user device may not be aware of the content gateway.

At block 220, the user device may receive one or more encrypted domain names. Such an encrypted domain name may be received from the content gateway based on the request sent by the user device. For example, the content gateway may have retrieved the requested content from the content host, identified domain names in the content, replaced the identified domain names with corresponding encrypted domain names, and sent the modified content comprising encrypted domain names to the user device. The user device may not be able to decrypt the domain name(s) because the user device may not be given the corresponding encryption key(s). If attempting to decrypt a domain name, the user device may determine that the domain name is inaccessible because the user device does not have, and did not receive, the encryption key for the domain name.

At block 230, the user device may send an encrypted domain name to the content provider to resolve the address of the encrypted domain name. The user device may receive a domain name and may send the domain name to a DNS server. The DNS server may perform a DNS lookup on the domain name to resolve an address, such as an IP address, associated with the domain name. Selection of a DNS server may be determined by the user device based upon the domain name. In a case where the user device receives an encrypted domain name from the content provider, the domain name may be constructed such that the user device may send the resolution request back to the content provider. The content provider may handle the request to resolve the domain name into its associated address. The content provider may allow the user device to view components involved in the resolution process, such as a proxy DNS server associated with the content provider. For example, in the example system of FIG. 1, the proxy DNS 120 may be visible to the user device 150. The content provider may also keep the proxy DNS opaque to the user device.

At block 240, the user device may receive an address associated with the requested content. The address may be received from the content provider in response to the transmission of an encrypted domain name, as described above. Such an address may be in the form of a network address that the user device may understand, such as an IP address. An address may identify a direct network location of content requested by the user device, such as content corresponding to an encrypted domain name of modified content received from the content gateway in block 220. Such a direct network location may allow the user device to request the content without the need for an additional DNS lookup. Thus, the user device may transition from receiving an encrypted domain name directly to receiving an address without receiving an intermediate unencrypted domain name that the user device may choose to block.

At block 250, the user device may request content from a content host associated with the address, such as the content host 130. As described above, this request may be made directly to the content host because the address may indicate a network address of the content host. Therefore, the user device may not need to perform an intermediate DNS lookup because the user device did not first receive a domain name of the content host.

At block 260, the user device may receive the requested content. The user device may not have received a plaintext domain name of the content host. Thus, the user device was not able to block content from the content host, such as one or more advertisements.

Blocks 230 to 260 may be repeated for one or more of the encrypted domain names received at block 220.

A user may have access to the Internet and DNS servers to resolve domain names into IP addresses. The user may access a web browser on a user device, such as a laptop, and may request content by typing a URL such as "http://www.examplesite.com" into the web browser. From the perspective of the user, the web browser may retrieve the content from a content provider for the user to consume. However, the user may only be able to view encrypted domain names of content assets instead of plaintext domain names because the web browser did not receive plaintext domain names from the content provider. Thus, the web browser was not able to block any domain names associated with content deemed undesirable by the user, such as advertisements.

From the device perspective, the web browser may attempt to access content located at a content host associated with the URL typed by the user by sending the request to the content provider. That URL may be configured to resolve to the content gateway. The content gateway may be configured to send requests for content to the content host. The content gateway may replace at least a portion of the content with an encrypted domain name. For example, the content gateway may replace a plaintext domain name of the content with an encrypted domain name. The web browser may receive one or more encrypted domain names. The web browser may attempt to resolve the IP address of an encrypted domain name by sending the encrypted domain name to the content provider. The web browser may receive the IP address of the content host, which the web browser may use to access the content. At any time throughout the process of accessing the content, the web browser may not receive a plaintext domain name of a content host. Thus, the web browser may not block content based on domain name.

FIG. 3 shows an example of the above domain name obfuscation process from the perspective of a proxy DNS server, such as the proxy DNS 120. The proxy DNS may be associated with a content provider, such as the content provider 102. The proxy DNS may also work in concert with a content gateway of the content provider, such as the content gateway 110, a shared area, such as the shared area 140, or both.

At block 310, the proxy DNS may receive a content request comprising an encrypted domain name from a user device, such as the user device 150. The encrypted domain name may have been generated by a content gateway, which may also be associated with the content provider the proxy DNS is associated with. The content provider may provide a mechanism, such as a communication channel, to share data such as encrypted domain names and their associated encryption keys between the content gateway and the proxy DNS. Such a mechanism may allow the proxy DNS to receive data directly from the content gateway. The content provider may also provide a shared area, such as the shared area 140, that is accessible to both the content gateway and the proxy DNS to facilitate such sharing of data.

At block 320, the proxy DNS may decrypt the encrypted domain name using a shared encryption key. The encryption key may be shared from the content gateway that generated the encrypted domain name. The proxy DNS may access the encryption key from the content gateway or from the shared area if the content gateway sent the encryption key to the shared area. The decrypted domain name may comprise contents of the request from the user device, such as the requested domain name or, as described below, metadata associated with the user and/or request. Plaintext domain names may not be sent to the user device so that the user device may not block them.

At block 330, the proxy DNS may determine an address of the requested content by using DNS lookup. A DNS lookup may be used to determine an address of a domain name. Such an address may be a network address of a content host associated with the domain name, such as the content host 130. The content host may be able to provide the user device with the requested content.

At block 340, the proxy DNS may send the address of the requested content to the user device. The address may allow the user device to access the requested content. Sending the address instead of the domain name to the user device may lessen or eliminate the chance of the user device blocking content such as advertisements.

A proxy DNS may be associated with a CDN. The proxy DNS may receive an encrypted domain name from a user device. The proxy DNS may be programmed to search a memory storage location of the CDN to locate the encryption key associated with the encrypted domain name. Once the encryption key is located, the proxy DNS may perform a decryption operation on the encrypted domain name. The decrypted domain name may comprise a domain name of an advertisement, e.g., "ads.adgenerator.net". The proxy DNS may perform a DNS lookup on such a domain name and determine the IP address of the advertisement, which the proxy DNS may send to the user device. The domain name of the advertisement may not be sent to the user device so that the user device may not block the advertisement based on the advertisement's domain name or the keywords "ad" and "ads" located within the domain name.

FIG. 4 shows an example of the above domain name encryption process from the perspective of a content gateway, such as the content gateway 110. The content gateway may be associated with a content provider, such as the content provider 102, and may provide an entry point to the content provider and/or content host, such as the content host 130, for user requests. The content gateway may also work in concert with a proxy DNS of the content provider, such as the proxy DNS 120, a shared area, such as the shared area 140, or both.

At block 410, a content request may be received from a user device, such as the user device 150. The content gateway may receive the content request. The content request may arrive in the form of a URL, domain name, or any other feasible method of requesting content.

At block 420, the content may be retrieved and associated domain names of the content may be identified. The content gateway may retrieve the content. The content gateway may also identify associated domain names of the content. The content may comprise one or more domain names. The content gateway may retrieve the content before the user device so that the content gateway may be able to obfuscate, from the user device, one or more of the domain names in the content. The content gateway may host content the user is requesting and be able to immediately proceed to the next step. The content gateway may need to retrieve a portion of content the user is requesting before proceeding to the next step. The content gateway may analyze the retrieved content and identify the one or more domain names of the content. For example, the content gateway may retrieve a webpage from the content host and parse domain names from the webpage.

Additionally or alternatively, at block 430, a new domain name may be generated for one or more identified domain name. The content gateway may generate the new domain name. A new domain name may be a domain name uniquely associated with the user device. Such a new domain name may comprise information associated with the user device, which may be in the form of metadata, may comprise additional metadata, such as a license key, may be arbitrary, or may comprise any combination thereof. The content gateway may retrieve one or more portions of the requested content so that these portions may be used to form a part of the new domain name. The content gateway may also host such content, in which case content retrieval may be unnecessary for integration into the new domain name.

At block 440, the content gateway may encrypt domain names with one or more corresponding encryption keys. By encrypting a newly generated domain name, the content gateway may be safeguarding the new domain name from being read by the user device. If the content gateway did not generate new domain names, the content gateway may encrypt one or more of the domain names identified at block 420 and append a domain name associated with a proxy DNS of the content provider to each encrypted domain name. Such a process may be performed by iterating over identified domain names and performing an encryption process following by an appending process. If the user device were to receive one or more unencrypted domain names, the user device may be able to block certain domain names, such as those domain names associated with advertisements. The encrypted domain name may be constructed in such a way that an attempt by a user device to resolve the encrypted domain name using a DNS query may cause a DNS server servicing the query to redirect the user device to a proxy DNS associated with the content provider.

At block 450, encryption keys may be shared with the proxy DNS. The content gateway may share the encryption keys. The content provider may provide a mechanism to share data such as encrypted domain names and their associated encryption keys between the content gateway and the proxy DNS. Such a mechanism may allow the content gateway to send data directly to the proxy DNS. An example mechanism may be a communication channel. The content provider may also provide a shared area, such as the shared area 140, that may be accessible to both the content gateway and the proxy DNS to facilitate the sharing of data. Sharing the encryption key for the encrypted domain names may allow the proxy DNS to decrypt and read the domain names should the user device send a request to resolve one or more of the encrypted domain names, as described with respect to the flow diagram of FIG. 3.

At block 460, encrypted domain names may be sent to the user device. The content gateway may send the encrypted domain name. The encrypted domain names may allow the user device to access addresses of the requested content from a proxy DNS that is able to decrypt the encrypted domain names. Sending the encrypted domain names to the user device instead of one or more plaintext domain names associated with the requested content may lessen or eliminate the chance of the user device blocking content such as advertisements. The content gateway may send a modified version of the content to the user device comprising the one or more domain names of the content replaced with their corresponding encrypted domain names.

A content gateway may be associated with a CDN. The content gateway may receive a request from a web browser to retrieve content associated with the URL "http://www.examplesite.com". The content gateway may be programmed to retrieve the webpage associated with the given URL. The content gateway may retrieve this webpage and may identify the domain names associated with the webpage contents. The content gateway may generate a new domain name for each of some or all of these identified domain names. The content gateway may use identifying information of the web browser to generate domain names uniquely associated with the web browser, which may be useful for user or device-specific actions, such as those involving a service-level agreement (SLA), described below. The content gateway may encrypt a generated domain name and share the encryption key with a memory storage location of the ISP. Additionally or alternatively, the content gateway may encrypt some or all of the identified domain names and may not generate new domain names. Whether or not domain name generation occurs, before sending the encrypted domain names to the web browser, the content gateway may append a domain name associated with a proxy DNS of the ISP to each encrypted domain name. An encrypted domain name with such an appendage may be of the form "<encrypted>.proxyAddress.net", where "proxyAddress.net" is the domain name of a proxy DNS associated with the ISP. Constructing an encrypted domain name in this manner may allow the web browser to request that the proxy DNS resolve the encrypted domain name without allowing the web browser to read the associated unencrypted domain name that is part of the webpage "www.examplesite.com". Thus, the web browser is not able to read and block domain names on this webpage.

The user device 150 may be a laptop computer using a web browser that may be able to access Internet service. The user may use the laptop to request content from URL "examplesite.com" using a web browser. The webpage "examplesite.com" may comprise links, coded as domain names, that resolve to images and advertisements, which the laptop or web browser may be configured to block. The URL may correspond to an address of a content host 130, which may be serviced by a CDN. The CDN may be a content provider 102 that controls the content gateway 110, the shared area 140, and the proxy DNS 120, and may allow these entities to work together to encrypt and decrypt data. The CDN may be configured to service requests to the content host 130. URL requests to the content host 130 may be directed to the content gateway 110 instead of the content host 130. Thus, the request from the web browser may be sent to the content gateway 110.

The content gateway 110 may receive the request from the web browser and may perform one or more actions. The content gateway 110 may retrieve the webpage associated with "examplesite.com" from the content host 130 and may identify the domain names that make up the content of "examplesite.com". The content gateway 110 may generate a new domain name for one or more of the identified domain names. Generation of a new domain name may use, at least in part, the contents of the webpage of "examplesite.com" or identifying criteria about the web browser. The content gateway 110 may encrypt one or more generated domain names using one or more respective encryption keys. Generation of a new domain name may use, at least in part, the domain name "examplesite.com", and the generated domain name may be encrypted using an encryption key. Additionally or alternatively, the content gateway 110 may not generate new domain names and may instead encrypt one or more identified domain names with one or more corresponding encryption keys and append a domain name associated with a proxy DNS of the ISP to each encrypted domain name. The content gateway 110 may send the encryption keys to the shared area 140 and may send the encrypted domain names to the web browser.

The web browser may receive the webpage of "examplesite.com" with the encrypted domain name(s) in place of domain names pointing to images or advertisements, which may appear as a series of random characters followed by "proxyAddress.net", such as "lktjq3lk.proxyAddress.net". The web browser may attempt to resolve an encrypted domain name by sending the encrypted domain name to a DNS server. The DNS records associated with the encrypted domain name may be configured to direct the request to the proxy DNS 120.

The proxy DNS 120 may receive an encrypted domain name and access the corresponding encryption key in the shared area 140. The proxy DNS 120 may decrypt the encrypted domain name. The proxy DNS 120 may resolve the decrypted domain name into an IP address using DNS and send the IP address to the web browser. The web browser may send a request to the content host 130 of the images or advertisements associated with the IP address and receive the images or advertisements in response.

The web browser was not able to block any domain names in the received content because the web browser did not receive plaintext domain names during the process.

The content gateway 110, the proxy DNS 120, the content host 130, the shared area 140, and the user device 150 may be software programs or software modules on a single computer. The software programs or modules may be sufficiently separated to ensure that the encryption keys may not be accessible by the file browser or other program acting as the user device 150, but otherwise operate in accordance with the methods described with respect to FIG. 1, with the caveat that file paths may be obfuscated from the user device 150 instead of domain names. The user device 150 may be a file browser or other program capable of making content requests, and a user may have requested a file name stored on local memory, which may reference other file names. The content gateway 110 may capture the request made by the file browser and generate and/or encrypt a unique file path in accordance with the methods described above. Connections between components may be one or more hardware circuits on the computer, such as a bus. The content gateway 110 may send the encryption key to a shared area 140 that is not accessible by the file browser, such as a computer storage area with permissions set to deny access to the file browser. The file browser may receive the encrypted file path, which may direct the file browser to send a request to a software program acting as a proxy DNS 120, such as a memory manager. The memory manager may access the shared area 140 to retrieve the encryption key and decrypt the received file path. The memory manager may perform one or more lookups, similar to DNS, by retrieving the memory addresses referenced in the requested file. The memory manager may send the file browser the memory addresses referenced in the file, and the file browser may retrieve the file from the local memory storage on the computer. The file browser acting as the user device 150 never sees the file paths of the referenced content.

A unique domain name generated by a content gateway, such as the content gateway 110, may include metadata associated with a user device making the request, such as the user device 150. For example, a unique domain name may comprise an identifier, name, media access control (MAC) address, or other identifying criteria. The domain name may be sent to a shared area, such as the shared area 140, along with the encryption key. Such a scheme may allow a proxy DNS, such as the proxy DNS 120, to access the metadata, generate statistics based on the metadata, and make determinations based on the metadata. The metadata may also be accessed by the proxy DNS (e.g., after decrypting the domain name), and may be stored in the shared area, in the proxy DNS, or in another feasible storage location.

The proxy DNS may be able to determine that the encrypted domain name was received by the user device from a second user device. The proxy DNS may be able to collect data regarding that particular second user device and may record such data or report such data to the shared area for collection. Mathematical analysis may be performed on this data to determine the number of times a domain name was shared, the number of times a domain name was viewed, the times of day a domain name was viewed, the duration of views, and the user devices used for viewing, or any combination thereof.

Metadata in a generated domain name may include instructions for a proxy DNS, such as the proxy DNS 120, to follow. Metadata in an encrypted domain name may include an expiration time for the domain name. The proxy DNS may deny requests to resolve an encrypted domain name e.g., after the expiration time. The metadata may instruct the proxy DNS to grant requests only from the user device the metadata describes, such as the user device 150. If the proxy DNS determines that a second user device is making the request, the proxy DNS may deny the request. A license server may also be involved in such an example to determine if the second user is an authorized user. Such mechanisms may be useful to thwart potential attackers.

Figure 5:
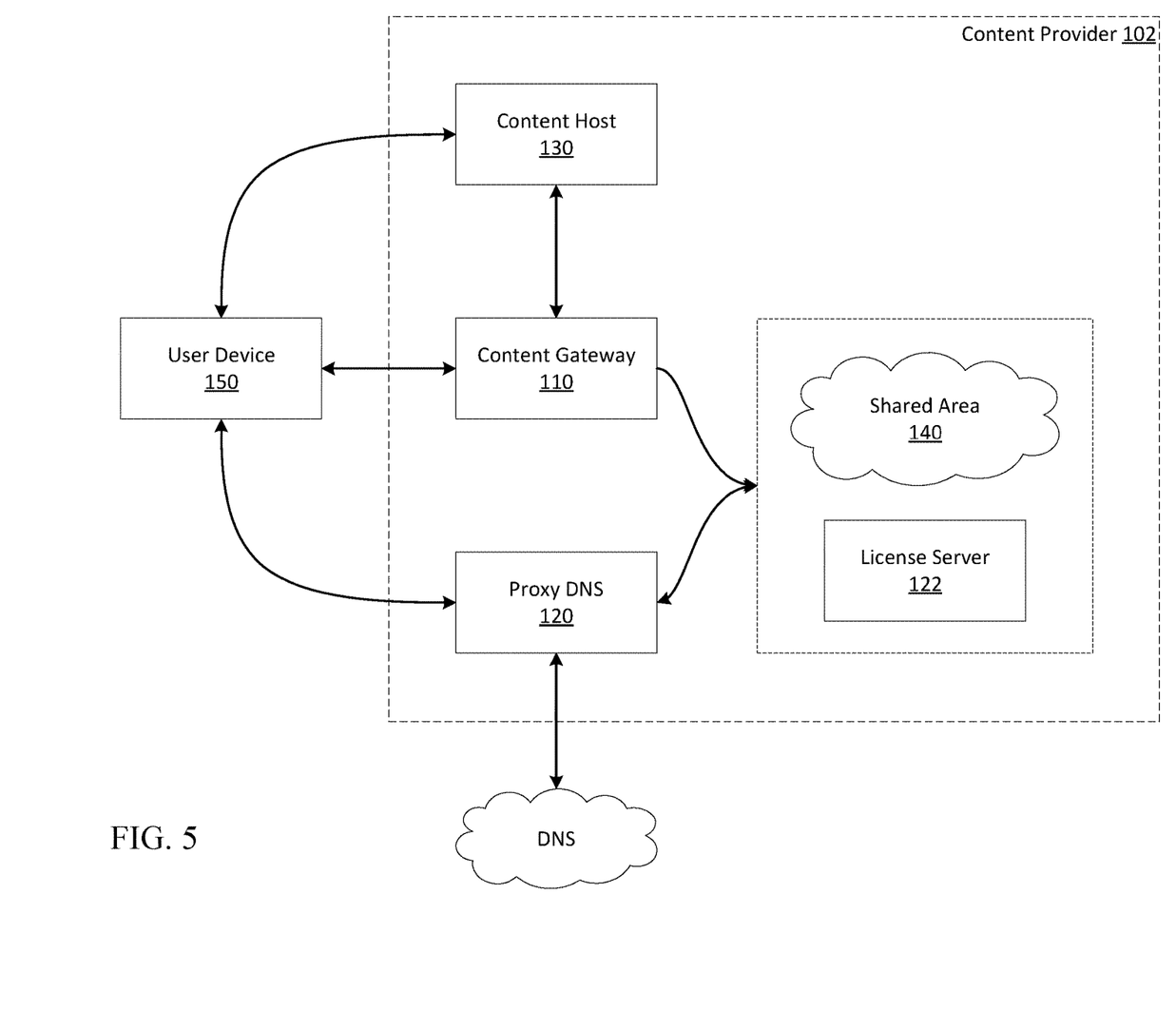
FIG. 5 shows a second example network.

A license server, such as the license server 122, and a content host, such as the content host 130, may be associated with a content provider, such as the content provider 102, as shown in FIG. 5. Metadata in a generated domain name may include permissions or service-level agreements (SLAs) associated with a user device, such as the user device 150. In instances where metadata includes SLA data, a proxy DNS, such as the proxy DNS 120, may perform an additional step of accessing the license server 122 to verify the permissions of the SLA of the user device before performing a DNS lookup. The license server 122 may respond to the proxy DNS 120 with the SLA terms associated with the user device 150, such as quality of service for presenting the content to the user device. For example, metadata may indicate that the user device 150 is not a premium subscriber of content, thus instructing the proxy DNS 120 to retrieve only those addresses that correspond to low-quality content. In an example where the metadata indicates that the user device 150 is a premium subscriber of content, the proxy DNS 120 may retrieve those addresses that correspond to faster or better servers.

With regard to FIG. 5, the content gateway 110, the proxy DNS 120, the content host 130, the shared area 140, the user device 150, and the license server 122 may be physical or digital and take any suitable form for their described purposes. For example, they may take the form of software components on one or more computers or one or more modules within a single software suite. The connections between these entities may be physical connections, such as those via hardware circuits or LAN cables, wireless connections, such as those via WiFi or cellular, or any other suitable communicative connection.

A content provider, such as the content provider 102, may wish to host a file on a content host, such as the content host 130, for millions of users to view. The content provider may encrypt that file with a single encryption key, which the content provider may share to one or more authorized user devices of the file. A user device, such as a user device 150, may use this encryption key to access the file. Use of a single encryption key shared among all authorized user devices may simplify the processes by which an unauthorized user device may gain access to the encryption key and access the encrypted content item because the single key is continually being sent through the communication network. Thus, the use of a single encryption key shared amongst an entire user base may allow certain user devices to avoid paying subscription fees or other fees associated with access to the content item, which negatively affects content hosts and their financial partners. The processes described herein may be used to address such problems.

Metadata comprising a non-shared key in a generated domain name may be used to eliminate the need for communicating shared keys to hosted content. A request by a user device, such as a user device 150, to a content gateway, such as a content gateway 110, to access such hosted content may cause the content gateway to generate one or more encrypted domain names with metadata. The metadata of a generated domain name may comprise a unique key for accessing the hosted content. A key may be unique to the user device, meaning that no other user device has the same key(s) to access the hosted content. A proxy DNS, such as the proxy DNS 120, may receive a request from the user and may make a request to a license server, such as the license server 122 to determine whether the request is valid. If valid, the proxy DNS may send the address of the content gateway to the user device; otherwise, the proxy DNS may send an error message to the user device. The user device may send a content request to the content gateway, which may comprise at least the encrypted domain name. The content gateway may receive the request from the user device and may decrypt the encrypted domain name. The decrypted domain name may comprise metadata, which may comprise the unique key. The content gateway may verify, from accessing a shared area, such as the shared area 140, the license server, or other metadata in the request, that the unique key is associated with the user device the proxy DNS received the request from. The content gateway may send the unencrypted content to the user device. Such a process may prevent access to chunks of a content file, such as a video file, so that one or more chunks may be accessible only by the user device.

The user device may receive a video manifest file comprising a list of encrypted domain names based on a request to receive a video file hosted by a content provider. One or more of those encrypted domain names may contain metadata comprising a key that indicates to the content provider that the user device may view the video file. The user device may send a request to resolve the first encrypted domain name of the video manifest file. The proxy DNS may receive this request, decrypt the domain name and key, verify metadata of the decrypted domain name with a license server, and resolve the decrypted domain name into its associated address. The resolved address may be an address of a content gateway of the content provider. The proxy DNS may send the address back to the user device. The user device may make a request to the content gateway, which may verify the key and send the requested content to the user device.

Using a shared key for hosting files may make it difficult to obtain analytical data about user devices accessing the data because each user device may access the data in an identical fashion. Software may need to be implemented on each user device to capture analytics for content requests, such as the segments of the content viewed, the time one or more requests for the content were made, the type of device accessing the content, and/or other useful analytical data, and may send this analytics data to a system for gathering data from user devices. Using the methods described above to create domain names with a unique key per user device for one or more file segments, a proxy DNS may capture analytics data and eliminate the need for analytical software on user devices. For example, a user device may make a request to a proxy DNS, and the proxy DNS may decrypt the domain name and unique key and capture, store, and/or analyze data associated with the user request and metadata.

Figure 6:
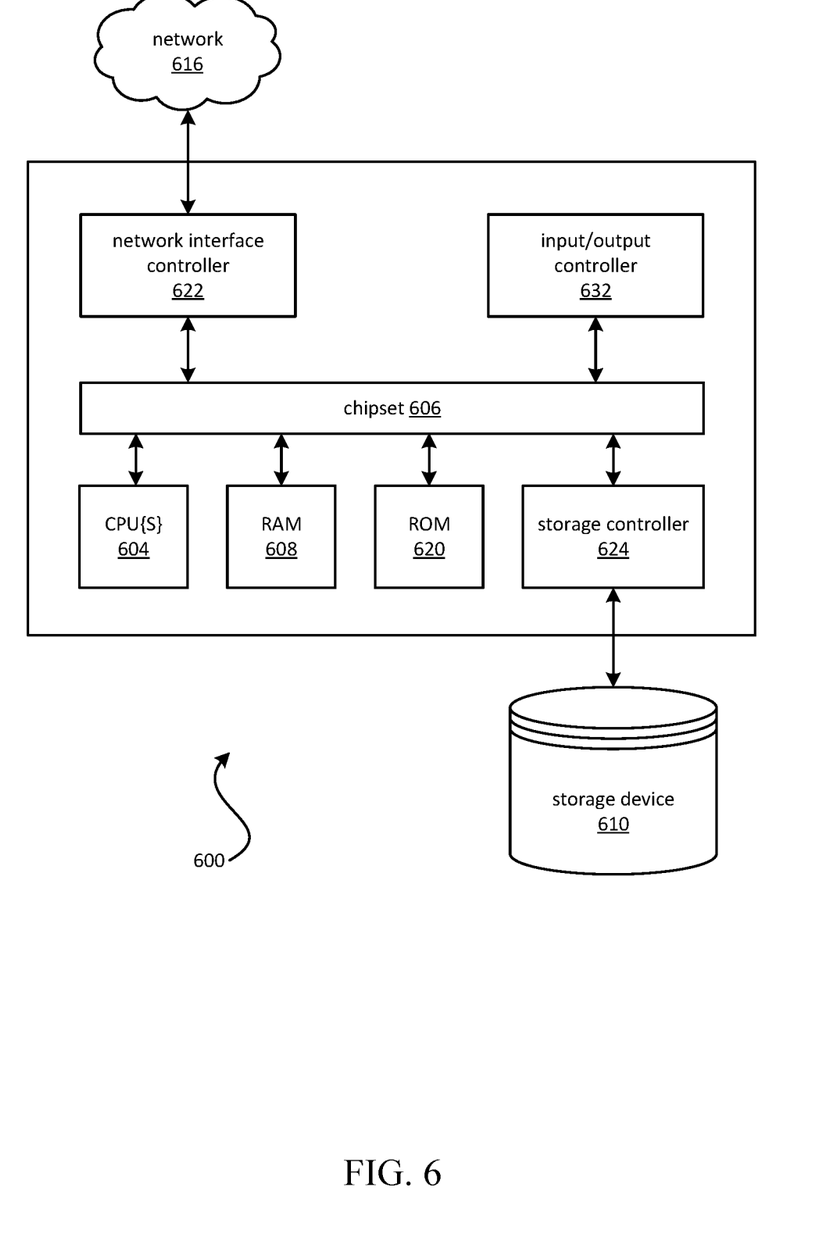
FIG. 6 shows an example computing system.

FIG. 6 shows an example computing device in which various components described herein may be embodied, such as any of the various devices shown in FIGS. 1 and 5. The computer architecture shown in FIG. 6 may correspond to a set-top box, remote control device, home automation system, desktop computer, laptop, tablet, network appliance, e-reader, smartphone, the content gateway 110, the proxy DNS 120, the content host 130, the shared area 140, the user device 150, the license server 122, or other computing device, and may be utilized to execute any aspects of the components described herein, such as to implement the operating procedures of FIGS. 2-4 and those described above.

A computing device 600 may include a baseboard, or "motherboard," which is a printed circuit board to which a multitude of components or devices may be connected by way of a system bus or other electrical communication paths. One or more central processing units ("CPUs") 604 may operate in conjunction with a chipset 606. The CPU(s)

604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 606 may provide an interface between the CPU(s) 604 and the remainder of the components and devices on the baseboard. The chipset 606 may provide an interface to a random access memory ("RAM") 608 used as the main memory in the computing device 600. The chipset 606 may further provide an interface to a computer-readable storage medium, such as a read-only memory ("ROM") 620 or non-volatile RAM ("NVRAM") (not shown), for storing basic routines that may help to start up the computing device 600 and to transfer information between the various components and devices. The ROM 620 or NVRAM may also store other software components necessary for the operation of the computing device 600 in accordance with the aspects described herein.

The computing device 600 may operate in a networked environment using logical connections to remote computing nodes and computer systems through a local area network ("LAN") 616. The chipset 606 may include functionality for providing network connectivity through a network interface controller (NIC) 622, such as a gigabit Ethernet adapter. The NIC 622 may be capable of connecting the computing device 400 to other computing nodes over the network 616. It should be appreciated that multiple NICs 622 may be present in the computing device 600, connecting the computing device to other types of networks and remote computer systems.

The computing device 600 may be connected to a mass storage device 610 that provides non-volatile storage for the computing device 600. The mass storage device 610 may store system programs, application programs, other program modules, and data, used to implement the processes and systems described in greater detail herein. The mass storage device 610 may be connected to computing device 600 through a storage controller 624 connected to the chipset 606. The mass storage device 610 may consist of one or more physical storage units. A storage controller 624 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 may store data on the mass storage device 610 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 610 is characterized as primary or secondary storage and the like.

For example, the computing device 600 may store information to the mass storage device 610 by issuing instructions through the storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from the mass storage device 610 by detecting the physical states or characteristics of one or more particular locations within the physical storage units.

In addition to the mass storage device 610 described above, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 610 may store an operating system utilized to control the operation of the computing device 600. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 610 may store other system or application programs and data utilized by the computing device 600.

The mass storage device 610 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described above. The computing device 600 may have access to computer-readable storage media storing computer-executable instructions, which, when executed by the computing device 600, may perform operating procedures shown in FIGS. 2-4 and those described above.

The computing device 600 may also include an input/output controller 632 for receiving and processing input from a number of input devices, such as a keyboard, a mouse, a touchpad, a touch screen, an electronic stylus, or other type of input device. Similarly, the input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing node may be a physical computing device, such as the computing device 600 of FIG. 6. A computing node may also include a virtual machine host process and one or more virtual machine instances operating on a physical computing device, such as the computing device 600. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the aforementioned detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. The methods and systems may also take the form of a computer program product on a computer-readable storage medium having computer-executable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. Certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Some or all of the software modules and/or systems may execute in memory on another device and communicate with the illustrated computing systems via inter-computer communication. Some or all of the systems and/or modules may also be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

What is claimed is:

1. A method, comprising:
   receiving, by a computing device from a user device, a request for content;
   sending, to the user device, an obfuscated domain name for an advertisement associated with the content; and
   sending, to a domain name system server, the obfuscated domain name.

2. The method of claim 1, wherein the obfuscated domain name is based on encrypting a domain name for the advertisement.

3. The method of claim 1, further comprising replacing, within the content, a plaintext domain name with the obfuscated domain name based at least in part on the request for content, and wherein the sending, to the user device, the obfuscated domain name comprises sending, to the user device, at least a portion of the content containing the obfuscated domain name.

4. The method of claim 1, further comprising appending a domain name associated with a proxy domain name system server to the obfuscated domain name.

5. The method of claim 4, wherein the sending, to the user device, the obfuscated domain name comprises sending, to the user device, the domain name associated with the proxy domain name system server appended to the obfuscated domain name.

6. The method of claim 1, wherein the sending, to the user device, the obfuscated domain name comprises sending, to the user device, a manifest file comprising the obfuscated domain name.

7. The method of claim 6, wherein the manifest file comprises a list of obfuscated domain names including the obfuscated domain name.

8. The method of claim 1, wherein the obfuscated domain name is unique to the user device.

9. The method of claim 1, wherein the obfuscated domain name is based, at least in part, on identifying information associated with the user device.

10. The method of claim 1, wherein the obfuscated domain name is unique to the user device based, at least in part, on metadata associated with the user device.

11. The method of claim 10, wherein the metadata comprises a key unique to the user device for accessing the content.

12. The method of claim 1, wherein the domain name system server comprises a proxy domain name system server.

13. A device, comprising:
   one or more processors; and
   memory storing instructions that, when executed by the one or more processors, cause the device to:
   receive, from a user device, a request for content;
   send, to the user device, an obfuscated domain name for an advertisement associated with the content; and
   send, to a domain name system server, the obfuscated domain name.

14. The device of claim 13, wherein the obfuscated domain name is based on encrypting a domain name for the advertisement.

15. The device of claim 13, wherein the instructions, when executed by the one or more processors, further cause the device to replace, within the content, a plaintext domain name with the obfuscated domain name based at least in part on the request for content, and wherein the instructions that cause the device to send, to the user device, the obfuscated domain name, when executed by the one or more processors, further cause the device to send at least a portion of the content containing the obfuscated domain name.

16. The device of claim 13, wherein the instructions, when executed by the one or more processors, further cause the device to append a domain name associated with a proxy domain name system server to the obfuscated domain name.

17. The device of claim 16, wherein the instructions that cause the device to send, to the user device, the obfuscated domain name, further cause the device to send, to the user device, the domain name associated with the proxy domain name system server appended to the obfuscated domain name.

18. The device of claim 13, wherein the instructions that cause the device to send, to the user device, the obfuscated domain name, further cause the device to send, to the user device, a manifest file comprising the obfuscated domain name.

19. The device of claim 18, wherein the manifest file comprises a list of obfuscated domain names including the obfuscated domain name.

20. The device of claim 13, wherein the obfuscated domain name is unique to the user device.

21. The device of claim 13, wherein the obfuscated domain name is based, at least in part, on identifying information associated with the user device.

22. The device of claim 13, wherein the obfuscated domain name is unique to the user device based, at least in part, on metadata associated with the user device.

23. The device of claim 22, wherein the metadata comprises a key unique to the user device for accessing the content.

24. The device of claim 13, wherein the domain name system server comprises a proxy domain name system server.

25. A non-transitory computer-readable medium storing instructions that, when executed, cause:
receiving, by a computing device from a user device, a request for content;
sending, to the user device, an obfuscated domain name for an advertisement associated with the content; and
sending, to a domain name system server, the obfuscated domain name.

26. The non-transitory computer-readable medium of claim 25, wherein the obfuscated domain name is based on encrypting a domain name for the advertisement.

27. The non-transitory computer-readable medium of claim 25, wherein the instructions, when executed, further cause replacing, within the content, a plaintext domain name with the obfuscated domain name based at least in part on the request for content, and wherein the instructions that cause the sending, to the user device, the obfuscated domain name, further cause sending, to the user device, at least a portion of the content containing the obfuscated domain name.

28. The non-transitory computer-readable medium of claim 25, wherein the instructions, when executed, further cause appending a domain name associated with a proxy domain name system server to the obfuscated domain name.

29. The non-transitory computer-readable medium of claim 28, wherein the instructions that cause the sending, to the user device, the obfuscated domain name, further cause sending, to the user device, the domain name associated with the proxy domain name system server appended to the obfuscated domain name.

30. The non-transitory computer-readable medium of claim 25, wherein the instructions that cause the sending, to the user device, the obfuscated domain name, further cause sending, to the user device, a manifest file comprising the obfuscated domain name.

31. The non-transitory computer-readable medium of claim 30, wherein the manifest file comprises a list of obfuscated domain names including the obfuscated domain name.

32. The non-transitory computer-readable medium of claim 25, wherein the obfuscated domain name is unique to the user device.

33. The non-transitory computer-readable medium of claim 25, wherein the obfuscated domain name is based, at least in part, on identifying information associated with the user device.

34. The non-transitory computer-readable medium of claim 25, wherein the obfuscated domain name is unique to the user device based, at least in part, on metadata associated with the user device.

35. The non-transitory computer-readable medium of claim 34, wherein the metadata comprises a key unique to the user device for accessing the content.

36. The non-transitory computer-readable medium of claim 25, wherein the domain name system server comprises a proxy domain name system server.

37. A system, comprising:
a domain name system server; and
a gateway configured to:
receive, from a user device, a request for content;
send, to the user device, an obfuscated domain name for an advertisement associated with the content; and
send, to the domain name system server, the obfuscated domain name.

38. The system of claim 37, wherein the obfuscated domain name is based on encrypting a domain name for the advertisement.

39. The system of claim 37, wherein the gateway is further configured to:
replace, within the content, a plaintext domain name with the obfuscated domain name based at least in part on the request for content, and
send, to the user device, at least a portion of the content containing the obfuscated domain name.

40. The system of claim 37, wherein the gateway is further configured to append a domain name associated with a proxy domain name system server to the obfuscated domain name.

41. The system of claim 40, wherein the gateway is further configured to send, to the user device, the domain name associated with the proxy domain name system server appended to the obfuscated domain name.

42. The system of claim 37, wherein the gateway is further configured to send, to the user device, a manifest file comprising the obfuscated domain name.

43. The system of claim 42, wherein the manifest file comprises a list of obfuscated domain names including the obfuscated domain name.

44. The system of claim 37, wherein the obfuscated domain name is unique to the user device.

45. The system of claim 37, wherein the obfuscated domain name is based, at least in part, on identifying information associated with the user device.

46. The system of claim 37, wherein the obfuscated domain name is unique to the user device based, at least in part, on metadata associated with the user device.

47. The system of claim 46, wherein the metadata comprises a key unique to the user device for accessing the content.

48. The system of claim 37, wherein the domain name system server comprises a proxy domain name system server.

* * * * *